United States Patent Office 2,906,778
Patented Sept. 29, 1959

2,906,778

2-ALLYLOXY-5-CHLOROBENZOPHENONE

David A. Gordon, Midland, Mich., assignor to The Dow Chemical Company, Midland, Mich., a corporation of Delaware No Drawing. Application May 8, 1958
Serial No. 733,826

1 Claim. (Cl. 260—591)

The present invention is directed to the novel compound 2-allyloxy-5-chlorobenzophenone and to a method for its preparation. The novel compound corresponds to the formula

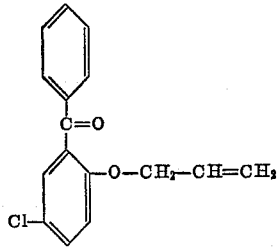

This compound is a crystalline solid, soluble in many common organic solvents, such as methanol and acetone, and of very limited solubility in water. It is useful as an acaricide and insecticide and is adapted to be applied to growing plants to protect them from parasitic arthropods.

The present compound is prepared by reacting allyl bromide with 5-chloro-2-hydroxy-benzophenone. The reaction is carried out in a liquid reaction medium and in the presence of aqueous alkali. Good results are obtained when employing approximately equimolecular proportions of 5-chloro-2-hydroxy-benzophenone and allyl bromide and an amount of aqueous alkali approximately stoichiometric with the bromine of the allyl bromide. Hydrogen bromide of reaction is formed and appears in the reaction mixture as the salt of reaction with the alkali which is preferably a concentrated aqueous alkali metal hydroxide.

In a preferred method of carrying out the reaction, the 5-chloro-2-hydroxy-benzophenone, allyl bromide and concentrated aqueous alkali metal hydroxide are dispersed together in liquid reaction medium which may be methylethyl ketone. The resulting reaction mixture is heated at the range of 50 to 100° C. with stirring for a period of time to carry the reaction to completion. Thereafter, liquid reaction medium may be removed by vaporization under reduced pressure and the resulting product mixture dispersed in water. The desired product may be solvent-extracted from the water dispersion, the extract dehydrated, solvent removed by vaporization and the resulting crude product purified by recrystallization.

The following example illustrates the invention but is not to be considered as limiting.

*Example 1*

Allyl bromide (36 grams; 0.30 mole), 58 grams (0.25 mole) of 5-chloro-2-hydroxy-benzophenone and 10 grams (0.25 mole) of sodium hydroxide in concentrated aqueous solution were dispersed together in 125 milliliters of methylethyl ketone. The resulting reaction mixture was heated at the boiling temperature (approximately 80° C.) and under reflux with stirring for 4 hours. Thereafter, methylethyl ketone reaction medium was removed by vaporization in a current of moving air and under slightly reduced pressure and the resulting product mixture was taken up in 400 milliliters of water at room temperature. The water dispersion was extracted repeatedly with methylene dichloride. The extract was dried over anhydrous calcium chloride and methylene dichloride solvent thereafter removed by vaporization leaving a crude product residue. This product was purified by recrystallization from methanol to obtain a 2-allyloxy-5-chlorobenzophenone product as a colorless crystalline solid belting at 40°–41° C.

The present compound is useful as a parasiticide and is adapted to be employed for the control of mites, commonly known as spider mites, parasitic upon economic plants. For such use, the compound may be dispersed on an inert finely divided solid and the resulting preparation employed as a dust. Also, such preparations may be dispersed in water with or without the aid of a wetting agent and the resulting aqueous suspensions employed as sprays. In other procedures, the compound may be employed in solvent such as an oil or as a constituent of solvent-in-water or water-in-solvent emulsions or as aqueous dispersions thereof which may be applied by spray, drench or wash. In a representative operation, the application as a wetting spray of a composition containing the compound of the present invention as sole toxicant at the rate of two pounds of toxicant per 100 gallons of ultimate composition to young cranberry bean plants heavily infested with two-spotted spider mite, *Tetranychus bimaculatus*, resulted in a 100 percent kill of the mites without evident injury to the bean plants.

I claim:
2-allyloxy-5-chlorobenzophenone.

References Cited in the file of this patent
UNITED STATES PATENTS

| 2,182,786 | Coleman et al. | Dec. 12, 1939 |
| 2,419,553 | Houtman | Apr. 29, 1947 |

OTHER REFERENCES

Funke et al.: Chem. Abstracts, vol. 48, pp. 3337–8 (1954).